United States Patent
Jackson, Jr. et al.

(10) Patent No.: US 6,863,613 B2
(45) Date of Patent: Mar. 8, 2005

(54) SEALED AXIALLY DISPLACEABLE SLIP JOINT

(75) Inventors: Robert N. Jackson, Jr., Florence, KY (US); Philip A. Eversole, Toledo, OH (US)

(73) Assignee: Torque Traction Technologies, Inc., Maumee, OH (US)

( * ) Notice: Subject to any disclaimer, the term of this patent is extended or adjusted under 35 U.S.C. 154(b) by 0 days.

(21) Appl. No.: 10/436,885

(22) Filed: May 13, 2003

(65) Prior Publication Data

US 2004/0229703 A1 Nov. 18, 2004

(51) Int. Cl.[7] .................................................. F16D 3/06
(52) U.S. Cl. ........................ 464/16; 464/133; 464/162; 277/565
(58) Field of Search ............................. 464/7, 16, 133, 464/162–169; 277/438, 491, 492, 562, 563, 565, 566, 645, 648

(56) References Cited

U.S. PATENT DOCUMENTS

| | | | |
|---|---|---|---|
| 2,867,482 A | * 1/1959 | Schmidt | 277/438 |
| 3,123,990 A | 3/1964 | Freeman | |
| 3,248,900 A | 5/1966 | Shurts | |
| 3,349,973 A | * 10/1967 | Smith | 277/438 X |
| 3,548,721 A | * 12/1970 | Eisennegger | 277/563 X |
| 3,942,336 A | 3/1976 | Schultenkamper | |
| 4,094,512 A | 6/1978 | Back | |
| 4,427,201 A | * 1/1984 | Belsanti | 277/565 |
| 4,592,556 A | 6/1986 | Nieman et al. | |
| 5,230,658 A | * 7/1993 | Burton | 464/16 |
| 5,421,591 A | 6/1995 | Katzensteiner | |
| 5,655,968 A | 8/1997 | Burton | |
| 5,853,177 A | 12/1998 | Brissette et al. | |

* cited by examiner

*Primary Examiner*—Greg Binda
(74) *Attorney, Agent, or Firm*—MacMillan, Sobanski & Todd, LLC

(57) ABSTRACT

A slip joint includes first and second shafts that are connected for concurrent rotational movement and for relative axial movement, such as by respective pluralities of axially extending spline. A seal can is secured to the first shaft and extends about a portion of the second shaft. A seal assembly is secured to the second shaft and engages a portion of the seal can. The seal assembly includes first and second seals that are each generally concave in shape. Each of the first and second seals is generally V-shaped in cross section, having a radially innermost end, an intermediate portion, and a radially outermost end, wherein the radially innermost and outermost ends are located closer to one another than the radially intermediate portions. the first and second seals are axially spaced apart from one another so as to define an annular space therebetween that can be filled with a sealing material, such as a waterproof grease. The first and second seals can be secured to a backing member that is secured to the second shaft.

12 Claims, 2 Drawing Sheets

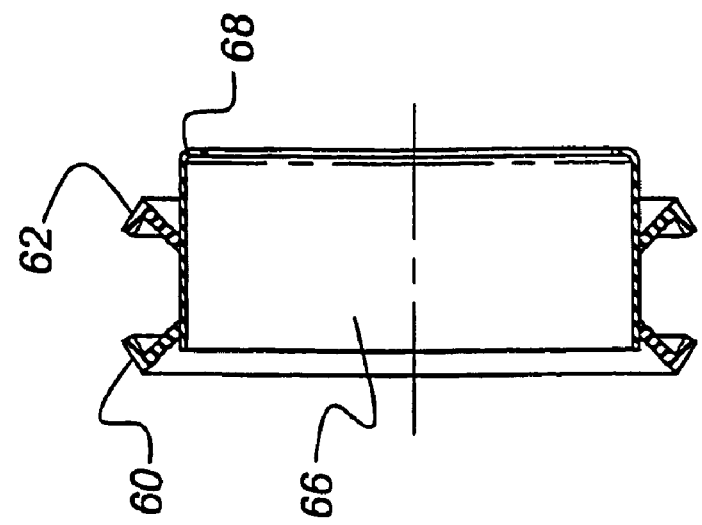
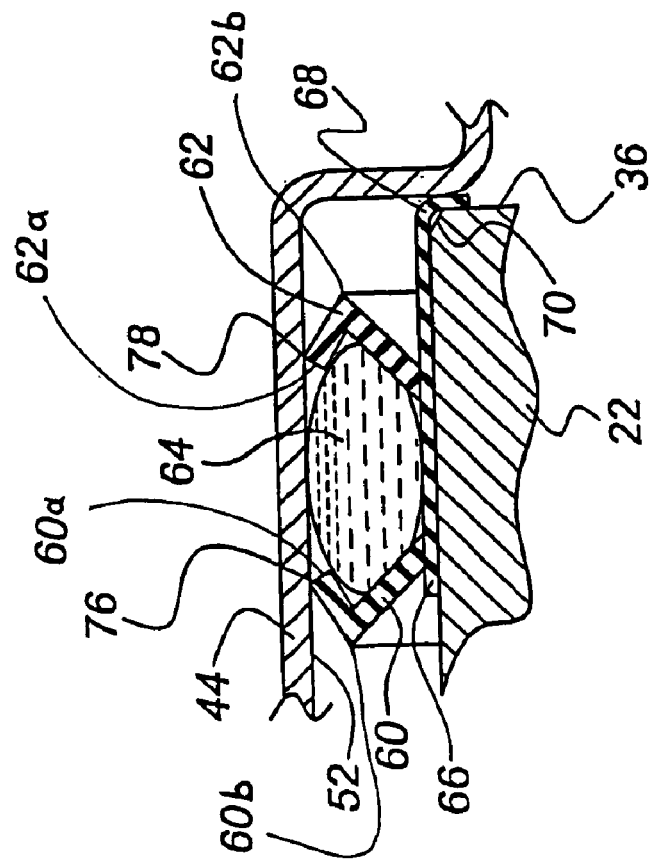

SEALED AXIALLY DISPLACEABLE SLIP JOINT

BACKGROUND OF THE INVENTION

This invention relates in general to driveshaft assemblies, such as those commonly found in the drive train systems of most vehicles. In particular, this invention relates to an improved seal arrangement for use with a slip joint in such a driveshaft assembly.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

Not only must a typical drive train system accommodate a limited amount of angular misalignment between the source of rotational power and the rotatably driven device, but it must also typically accommodate a limited amount of relative axial movement therebetween. For example, in most vehicles, a small amount of relative axial movement frequently occurs between the engine/transmission assembly and the axle assembly when the vehicle is operated. To address this, it is known to provide a slip joint in the driveshaft assembly. A typical slip joint includes first and second members that have respective structures formed thereon that cooperate with one another for concurrent rotational movement, while permitting a limited amount of axial movement to occur therebetween. Two types of slip joints are commonly used in conventional driveshaft assemblies, namely, a sliding spline type and a rolling ball spline type.

A typical sliding spline type of slip joint includes male and female members having respective pluralities of splines formed thereon. The male member is generally cylindrical in shape and has a plurality of outwardly extending splines formed on the outer surface thereof. The male member may be formed integrally with or secured to an end of the driveshaft assembly described above. The female member, on the other hand, is generally hollow and cylindrical in shape and has a plurality of inwardly extending splines formed on the inner surface thereof. The female member may be formed integrally with or secured to a yoke that forms a portion of one of the universal joints described above. To assemble the slip joint, the male member is inserted within the female member such that the outwardly extending splines of the male member cooperate with the inwardly extending splines of the female member. As a result, the male and female members are connected together for concurrent rotational movement. However, the outwardly extending splines of the male member can slide relative to the inwardly extending splines of the female member to allow a limited amount of relative axial movement to occur between the engine/transmission assembly and the axle assembly of the drive train system.

Typically, the driveshaft assembly is located on the underside of the vehicle where contaminants, such as dirt, water, and the like, could enter the assembly at the slip joint if it were not adequately sealed. The area on the surface of a driveshaft assembly, where the sleeve shaft terminates and ceases to overlap the outer surface of the inner shaft, is highly susceptible to the entrance of contaminants, which can interfere with axial movement of the sleeve shaft relative to the inner shaft. These contaminants can also cause corrosion and rust on the components of the driveshaft assembly. To avoid this difficulty and to seal the slip joint, it is conventional practice to use a boot fixed at each of its ends, one end being secured to the outer surface of the outer shaft, the other end of the boot being secured to the outer surface of the sleeve shaft. These boots are typically made of rubber and have folded or pleated surfaces that accommodate axial displacement of the two shafts and permit a minor amount of angular movement. However, these boots are relatively expensive and are themselves susceptible to wear and damage. Booted seals are also susceptible to damage due to the high temperature environment in which they operate. It is preferable to provide a reliable, movement-tolerant seal against the entrance of contaminants, a seal that can endure a high temperature environment and is not susceptible to damage, such as the splitting and tearing that may occur with a booted seal.

SUMMARY OF THE INVENTION

This invention provides a seal for a slip joint for a first component and second component having relative axial displacement. The invention includes a hollow cylindrical can surrounding and spaced radially from the first component, extending axially from and secured to the second component, and a seal secured to the first component and resiliently contacting the can, the first component and can defining an axial passage having a constricted opening that inhibits entry of foreign material and its travel toward the seal. In another embodiment applicable to a driveshaft of a motor vehicle, the present invention includes a first shaft, having a surface formed with axially directed spline teeth, a second shaft arranged substantially co-axially with the first shaft and having a surface formed with axially directed spline teeth engaged with the spine teeth of the first shaft, the first and second shafts being mutually displaceable, a can surrounding and spaced radially from the first shaft and secured to the second shaft, a sealing surface, and a seal assembly secured to the first shaft and resiliently contacting the sealing surface. In addition to providing a sealing surface, the can protects the seal from the environment. A seal is formed with complementary fingers, which provide a space for holding waterproof grease packed between the seal fingers, thereby providing additional sealing. The surface finish of a sealing surface on the can provides adequate sealing and seal assures lip durability. This sealing surface eliminates the need for machining a seal surface on the sleeve shaft. An added labyrinth between the sleeve shaft can resist contamination entry to the seal.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is an enlarged sectional elevational view of area 2 shown in FIG. 1.

FIG. 3 is a cross section of a metal backing and a pair of seal fingers.

DETAILED DESCRIPTION OF THE PREFERRED EMBODIMENT

Figure 1:
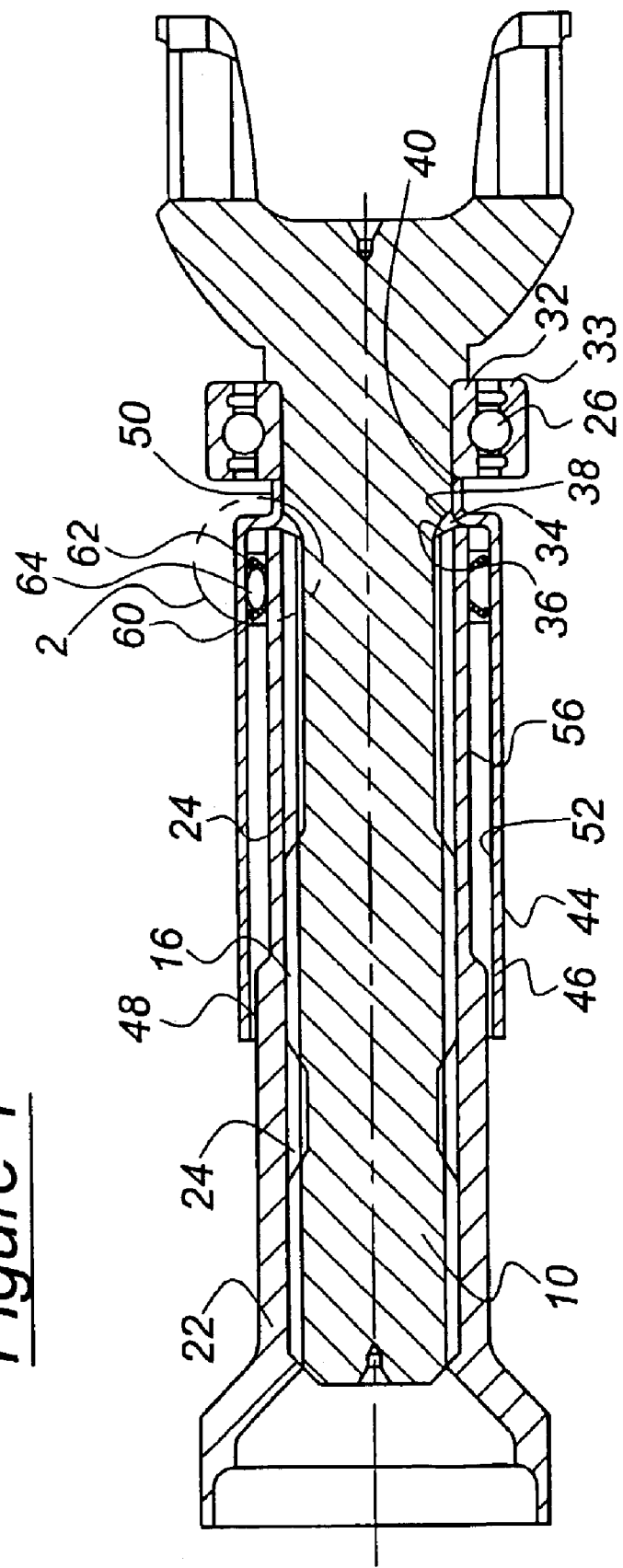
FIG. 1 is a sectional elevational view of a slip joint including a seal arrangement in accordance with this invention.

Referring now to the drawings, there is illustrated in FIG. 1 a sliding spline type of slip joint including a seal arrangement in accordance with this invention. The slip joint is generally conventional in the art and can, for example, be used in a driveshaft assembly of the type described above to transmit rotational from a source to a driven mechanism, such as from an output shaft of a vehicular transmission to an input shaft of an axle assembly. However, the scope of this invention is not intended to be limited for use with the specific structure for the slip joint illustrated in FIG. 1 or with vehicle drive train systems in general. On the contrary, as will become apparent below, this invention may be used in any desired environment for the purposes described below.

The illustrated slip joint includes a first inner shaft 10 that extends axially from a yoke that can, for example, form a portion of a universal joint in the driveshaft assembly, such as described above. The illustrated portion of the universal joint is a conventional cardan type of joint. However, this invention may, if desired, be used with any type of universal joint, including constant velocity joints, rubber couplings, and the like. The inner shaft 10 is formed or otherwise provided with a plurality axially-directed, angularly-spaced spline teeth 16 that extend radially outwardly from an outer surface thereof. The slip joint also includes an outer sleeve shaft 22 that is axially aligned with and surrounds the inner shaft 10. The outer sleeve shaft 22 is formed or otherwise provided with a plurality of axially-directed, angularly-spaced spline teeth 24 that extend radially inwardly from an inner surface thereof.

The slip joint is assembled by inserting the inner shaft 10 within the outer sleeve shaft 22 such that each of the external spline teeth 16 on the inner shaft 10 is located between adjacent ones of the internal spline teeth 24 on the outer sleeve shaft 22. As a result, the inner shaft 10 and the outer sleeve shaft 22 are engaged mutually for rotation and to transmit torque. Due to the engagement of the external and internal spline teeth 16 and 24, respectively, the inner shaft 10 and the outer sleeve shaft 22 can also slide axially relative to one another, at least to a limited extent. The external and internal spline teeth 16 and 24, respectively, engage one another in an annular, axially extending space that is defined between the inner shaft 10 and the outer sleeve shaft 22. One end 34 of that annular, axially extending space is located between an end 36 of outer sleeve shaft 22 and an end 38 of a shoulder 40 formed on the outer surface of inner shaft 10.

The slip joint can, if desired, be supported for rotation by a conventional bearing assembly 26. The illustrated bearing assembly 26 includes an inner race 32 that engages the outer surface of inner shaft 10 and an outer race 33 that can be engaged with a support surface (not shown), such as a portion of a chassis of the vehicle. Similarly, another bearing (not shown) can be provided to rotatably support a second portion of the slip joint at another location.

A seal assembly is provided to prevent the entry of contaminants into the one end 34 of the annular, axially extending space wherein the external and internal spline teeth 16 and 24 of the inner shaft 10 and the outer sleeve shaft 22, respectively, engage one another. The seal assembly includes a seal can 44 having a hollow cylindrical portion 46 that extends axially about a relatively lengthy portion of the outer surface of the outer sleeve shaft 22. A first end of the seal can 44 is formed having a reduced diameter flange portion 50, which can be provided to press fit or otherwise support the seal can 44 on an outer surface of the shoulder or other portion of the inner shaft 10. A second end of the seal can 44 is open and extends about a shoulder 48 provided on the outer surface of the outer sleeve shaft 22. The enlarged diameter shoulder 48 cooperates with an inner surface 52 of the seal can 44 to provide a constricted space that resists the entry of contaminants therein. Preferably, the seal can 44 is formed from a stamped metallic or other relatively rigid material. The inner surface 52 of the seal can 44 is preferably formed in such a manner as to provide a smooth sealing surface, for a purpose that will be explained in detail below.

The seal assembly also includes a pair of seals 60 and 62 that are located in an annular space that is defined between an outer surface 56 of the outer sleeve shaft 22 and the inner surface 52 of seal can 44. As best shown in FIGS. 2 and 3, the seals 60 and 62 are preferably molded or otherwise secured to an outer surface of a backing member 66. The backing member 66 is generally hollow and cylindrical in shape and may, for example, be press fit on the outer surface 56 of the outer sleeve shaft 22. If desired, the backing member 66 can include a radially extending flange portion 68 that extends partially over the end 36 of outer sleeve shaft 22. To facilitate the insertion of the backing member 66 over the end 36 of the outer sleeve shaft 22, a chamfer 70 may be formed on the outer peripheral edge of such end 36. The flange portion 68 can be provided to precisely position the backing member 66 and the seals 60 and 62 relative to the outer sleeve shaft 22.

Each of the seals 60 and 62 is preferably formed from a flexible material, such as rubber or other conventional elastomeric material. The seals 60 and 62 project radially outwardly from the backing member 66 and terminate at respective sealing lips 76 and 78. The sealing lips 76 and 78 are sized to be urged into sealing engagement with the inner surface 52 of the seal can 44 with a relative light, elastic pre-loading force. The seals 60 and 62 are generally concave in shape, having radially innermost and outermost ends that are located closer to one another than their radially intermediate portions. In the illustrated embodiment, each of the seals 60 and 62 has a generally V-shaped cross sectional shape, with the open ends 60a and 62a, respectively, of the V-shaped seals 60 and 62 facing toward one another and the closed ends 60b and 62b, respectively, thereof facing away from one another. However, the seals 60 and 62 may be formed having any desired shape or shapes.

The seals 60 and 62 are axially spaced apart from one another so as to define an annular space therebetween. This annular space is preferably filled with a sealing material 64 to further prevent the passage of contaminants therethrough. Any desired sealing material may used, such as a conventional waterproof grease.

In operation, the inner shaft 10 and the outer sleeve shaft 22 of the slip joint are rotatably driven to transfer rotational power from the source to the driven device. As mentioned above, the hollow cylindrical portion 46 of the seal can 44 extends axially about a relatively lengthy portion of the outer surface of the outer sleeve shaft 22. The enlarged diameter shoulder 48 provided on the outer surface 56 of the outer sleeve shaft 22 cooperates with the inner surface 52 of the second, open end of the seal can 44 to create a constricted space that resists the entry of contaminants therein. Thus, most of the contaminants that are encountered during operation are prevented from entering into the slip joint by this constricted space. Any such contaminants that do enter the slip joint through this constricted space must then pass along the axial length of the seal can 44 before reaching the seals 60 and 62. As also mentioned above, the sealing lips 76 and 78 of the seals 60 and 62 are urged into sealing engagement with the inner surface 52 of the seal can 44. As a result, the passage of the contaminants through the seals 60 and 62 is effectively deterred. The presence of the sealing material 64 in the annular space between the seals 60 and 62 further deters the passage of the contaminants therethrough.

During operation of the slip joint, the inner shaft 10 and the outer sleeve shaft 22 of the slip joint may move axially relative to one another. When such relative axial movement occurs, the seal can 44 (which is connected for movement with the inner shaft 10) moves axially relative to the seals 60 and 62 (which are connected for movement with the outer sleeve shaft 22. During such movement the sealing lips 76 and 78 of the seals 60 and 62 slide along the inner surface 52 of the seal can 44. As mentioned above, the inner surface 52 of the seal can 44 is preferably formed in such a manner as to provide a smooth sealing surface. Thus, such axial sliding movement of the seals 60 and 62 relative to the seal can 44 occurs without detracting from the seal that is created therebetween. Accordingly, the seals 60 and 62 continue to deter the passage of the contaminants therethrough.

Thus, the seal can 44 protects the seals 60 and 62 from the environment, and further functions to minimize the amount of contaminants that reach the seals 60 and 62. The spaced apart seals 60 and 62 provide an annular space for retaining a sealing material 64, such as a waterproof grease, packed therebetween, thereby providing additional sealing. The surface finish of the inner sealing surface 52 of the seal can 44 provides adequate sealing, promotes seal lip durability, and eliminates the need for seal surface machining on the outer sleeve shaft 22.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A slip joint comprising:

first and second shafts that are connected for concurrent rotational movement and for relative axial movement; and a seal assembly including a seal can having a first portion that is secured to said first shaft and a second portion that extends about a portion of said second shaft, said seal assembly also including first and second seals that are secured to said second shaft and that engage a portion of said seal can, each of said first and second seals having a radially innermost end, an intermediate portion, and a radially outermost end, said radially innermost and outermost ends being located closer to one another than said radially intermediate portions.

2. The slip joint defined in claim 1 wherein each of said first and second seals is generally V-shaped in cross section.

3. The slip joint defined in claim 1 wherein each of said first and second seals is generally V-shaped in cross section defining an open end and a closed end, wherein with the open ends face toward one another and said closed ends face away from one another.

4. The slip joint defined in claim 1 wherein said first and second seals are axially spaced apart from one another so as to define an annular space therebetween.

5. The slip joint defined in claim 4 wherein said annular space is filled with a sealing material.

6. The slip joint defined in claim 5 wherein said sealing material is a waterproof grease.

7. The slip joint defined in claim 1 wherein said sealing assembly further includes a backing member that is secured to said second shaft, wherein said first and second seals are secured to said backing member.

8. The slip joint defined in claim 7 wherein said backing member has a flange portion provided thereon that engages said second shaft to position said backing member relative to said second shaft.

9. The slip joint defined in claim 1 wherein said first shaft has a first plurality of splines provided thereon and said second shaft has a second plurality of splines provided thereon, said first and second pluralities of splines cooperating to connect said first and second shafts for concurrent rotational movement and for relative axial movement.

10. The slip joint defined in claim 1 wherein said seal can includes a hollow cylindrical portion, and wherein said first and second seals engage said hollow cylindrical portion of said seal can.

11. The slip joint defined in claim 1 wherein said seal can includes a hollow cylindrical portion and a flange portion, wherein said flange portion is secured to said first shaft and said first and second seals engage said hollow cylindrical portion of said seal can.

12. The slip joint defined in claim 1 wherein said first and second seals are each formed from a resilient material.

* * * * *